(12) United States Patent
Spiegel et al.

(10) Patent No.: US 8,479,509 B2
(45) Date of Patent: Jul. 9, 2013

(54) INTERNAL COMBUSTION ENGINE

(75) Inventors: Leo Spiegel, Vaihingen/Enz (DE);
Van-Khanh Tran, Weissach (DE);
Hartmut Voss, Wimsheim (DE);
Dietmar Schwarzenthal, Ditzingen (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 609 days.

(21) Appl. No.: 12/706,846

(22) Filed: Feb. 17, 2010

(65) Prior Publication Data

US 2010/0236237 A1 Sep. 23, 2010

Related U.S. Application Data

(60) Provisional application No. 61/175,156, filed on May 4, 2009.

(30) Foreign Application Priority Data

Mar. 23, 2009 (DE) .................. 10 2009 014 086

(51) Int. Cl.
*F01N 1/00* (2006.01)
*F02D 23/00* (2006.01)
*F01L 1/34* (2006.01)
*F02B 47/08* (2006.01)
*F02M 25/07* (2006.01)

(52) U.S. Cl.
USPC ......... 60/602; 60/324; 123/90.15; 123/90.17; 123/568.14

(58) Field of Classification Search
USPC ... 60/280, 324, 602, 605.1; 123/90.15–90.17, 123/321, 345–348, 568.14
See application file for complete search history.

(56) References Cited

U.S. PATENT DOCUMENTS

| 6,105,550 A | 8/2000 | Nieberding |
| 6,192,858 B1 | 2/2001 | Nieberding |

(Continued)

FOREIGN PATENT DOCUMENTS

| DE | 198 18 569 A1 | 11/1999 |
| DE | 19852552 | 5/2000 |

(Continued)

OTHER PUBLICATIONS

Japanese Office Action dated Jul. 6, 2011, issued in related Japanese Patent Application No. 2010-065576, with English Translation.

(Continued)

*Primary Examiner* — Kenneth Bomberg
*Assistant Examiner* — Audrey K Bradley
(74) *Attorney, Agent, or Firm* — RatnerPrestia

(57) ABSTRACT

A method for operating an internal combustion engine with compression ignition or with spark ignition as a function of an operating point. A specific residual exhaust-gas quantity in the combustion space is set for compression ignition. The internal combustion engine is operated as a function of the operating point by an outlet cam, by which a first outlet opening phase and a second outlet opening phase take place. The second outlet opening phase commences during an inlet opening phase. At a first operating point in a compression-ignition mode, a residual exhaust-gas quantity in a combustion space is dimensioned as a function of a valve interference set between the inlet and the outlet valve during a charge exchange. At a second operating point in the compression-ignition mode the residual exhaust-gas quantity in the combustion space is dimensioned as a function of a duration of the second outlet opening phase.

9 Claims, 12 Drawing Sheets

U.S. PATENT DOCUMENTS

| | | |
|---|---|---|
| 6,651,616 B1 | 11/2003 | Juretzka |
| 2001/0032465 A1 | 10/2001 | Terry |
| 2005/0016496 A1 | 1/2005 | Hitomi |
| 2006/0016420 A1 | 1/2006 | Kuo |
| 2006/0016438 A1 | 1/2006 | Kang |
| 2006/0201489 A1 | 9/2006 | Brachert |
| 2006/0219212 A1 | 10/2006 | Brachert |
| 2007/0028600 A1* | 2/2007 | Ogawa et al. ............... 60/285 |
| 2009/0132146 A1* | 5/2009 | Dibble et al. ............... 701/102 |

FOREIGN PATENT DOCUMENTS

| | | |
|---|---|---|
| DE | 19923413 | 11/2000 |
| DE | 19944534 | 3/2001 |
| DE | 10348138 | 5/2005 |
| DE | 10348139 | 5/2005 |
| DE | 60114987 | 7/2006 |
| DE | 112005001819 | 5/2007 |
| DE | 112005001662 | 7/2008 |
| EP | 0798451 | 10/1997 |
| JP | 2001065372 A | 3/2001 |
| JP | 2002349356 A | 12/2002 |
| JP | 2005016407 A | 1/2005 |
| JP | 2006266237 A | 10/2006 |
| JP | 2009002275 A | 1/2009 |

OTHER PUBLICATIONS

German Search Report issued on Jun. 30, 2011, in related Application No. DE 10 2009 014 086.7 (with partial English translation).

* cited by examiner

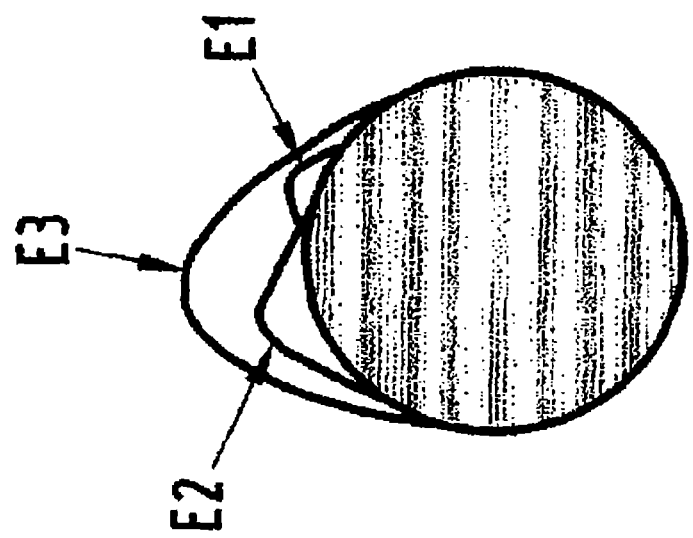
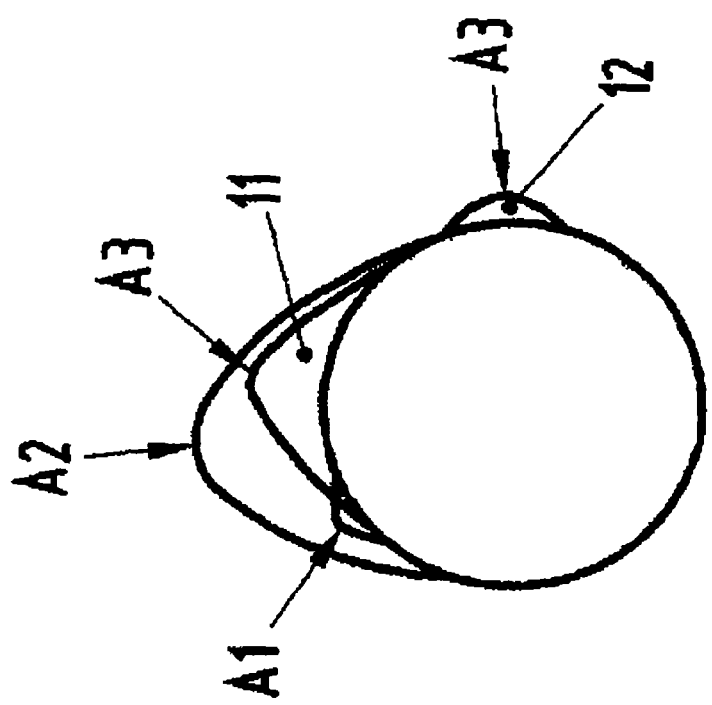
Fig. 5

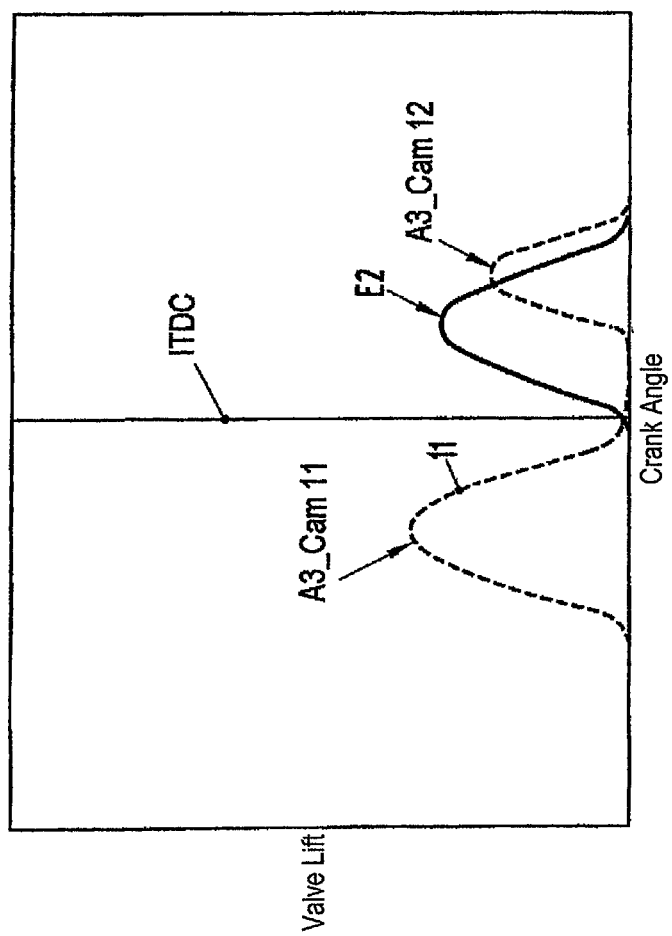

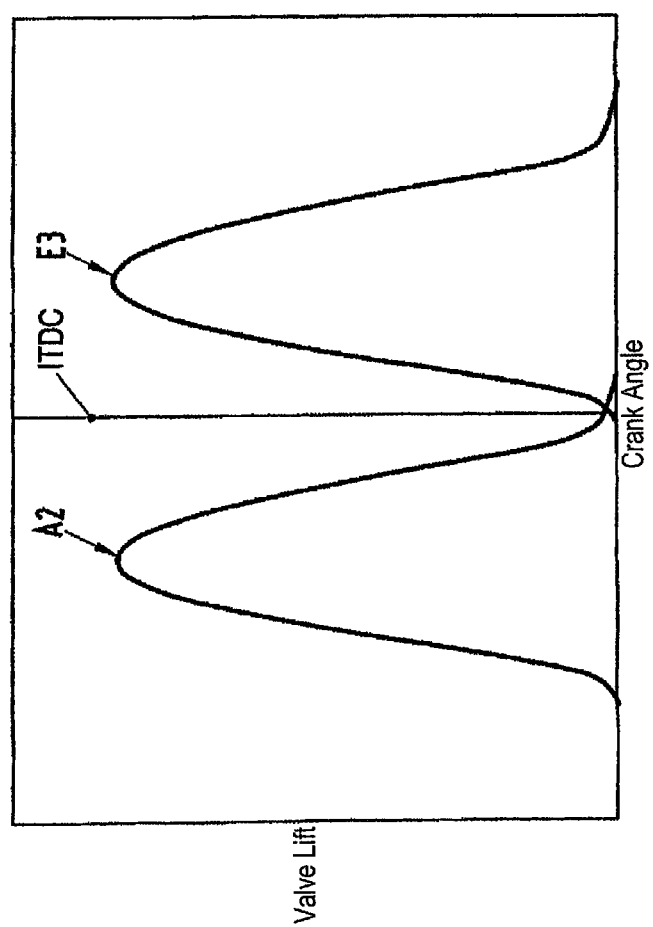

INTERNAL COMBUSTION ENGINE

CROSS REFERENCE TO RELATED APPLICATIONS

This U.S. application claims priority to German Application No. DE 10 2009 014 086.7, filed on Mar. 23, 2009 and U.S. Provisional Application No. 61/175,156 filed on May 4, 2009 which are incorporated by reference herein in their entirety.

FIELD OF THE INVENTION

The invention relates to a method for operating an internal combustion engine, and to an internal combustion engine for carrying out such a method.

BACKGROUND OF THE INVENTION

DE 198 18 596 C5 discloses a method for operating a petrol engine, by means of which operation of the petrol engine with compression ignition in a part-load range is regulated. In this case, in a compression-ignition mode, a specific exhaust-gas quantity is retained in the combustion space and compressed, a fuel quantity being injected into the compressed exhaust-gas quantity before a supply of fresh air is started. In this case, the retained exhaust-gas quantity is regulated with the aid of an exhaust-gas retention flap.

SUMMARY OF THE INVENTION

An object on which the invention is based is to provide a method for operating an internal combustion engine with improved combustion, which is operated with compression ignition or with spark ignition as a function of the operating point.

The method according to aspects of the invention is distinguished in that the internal combustion engine is operated as a function of the operating point by means of an outlet cam, by means of which a first outlet opening phase and a second outlet opening phase take place, the second outlet opening phase commencing during an inlet opening phase, and, at a first operating point in a compression-ignition mode, the residual exhaust-gas quantity in the combustion space being set as a function of a valve interference set between the inlet and outlet valve during a charge exchange, and, at a second operating point in the compression-ignition mode, the residual exhaust-gas quantity in the combustion space being set as a function of a duration of the second outlet opening phase. Preferably, during a changeover from the first operating point to the second operating point, and vice versa, the internal combustion engine is operated with spark ignition. By virtue of the method according to aspects of the invention, an extension of compression-ignition operation to broad ranges of the characteristic map of the internal combustion engine can be achieved, the method according to aspects of the invention making it possible to have a rapid and reliable changeover from compression-ignition operation to a spark-ignition operation.

According to a refinement of the invention, the exhaust-gas system is provided with an exhaust-gas back-pressure adjustment device, by means of which the exhaust-gas back-pressure in an exhaust manifold of the exhaust-gas system is varied and/or set as a function of the operating point. By means of such an exhaust-gas back-pressure adjustment device, a uniform exhaust-gas back-pressure is achieved in the entire region of the exhaust manifold, so that, virtually at any desired time point, there is in the region of the outlet valves an exhaust-gas back-pressure which makes it possible to have a directed setting of the residual exhaust-gas quantity in the combustion space. Preferably, the residual exhaust-gas quantity in the combustion space is dimensioned as a function of the position of the exhaust-gas back-pressure adjustment device. As a result, the setting and dimensioning of an exhaust-gas quantity and exhaust-gas temperature, necessary for the respective operating point, in the combustion space can be predicted.

According to an advantageous refinement of the invention, the inlet valves and the outlet valves are controlled, at the second operating point of the compression-ignition mode, in such a way that a specific exhaust-gas quantity is sucked out of the exhaust-gas system back into the combustion space. A reliable dimensioning of the residual exhaust-gas quantity in the combustion space can thereby be achieved.

According to a further aspect of the invention, to carry out the method according to the invention, an internal combustion engine is provided, in which a sliding-cam device having a plurality of cams is provided in the outlet-valve drive, at least one outlet cam being designed as a double cam for the setting of two outlet opening phases, and the inlet-valve drive having a sliding-cam device with a plurality of cams. An extension of the compression-ignition mode to further operating points of the internal combustion engine can thereby be carried out, so that an extended operational characteristic map with auto-ignition is made possible.

BRIEF DESCRIPTION OF THE DRAWINGS

It will be appreciated that the features mentioned above and those yet to be explained below can be used not only in the combination specified in each case, but also in other combinations or alone, without departing from the scope of the present invention. Further features of the invention may be gathered from the subclaims, the following description and the drawing in which:

FIG. 5 shows a sectional view of the cam forms of the inlet and outlet valves from FIG. 4, FIG. 11 shows an illustration of valve lift profiles of inlet and outlet valves for an operating point in a lower middle load range, and FIG. 12 shows an illustration of valve lift profiles of inlet and outlet valves for an operating point in an upper load range.

DETAILED DESCRIPTION OF THE PREFERRED EMBODIMENTS

Figure 1:
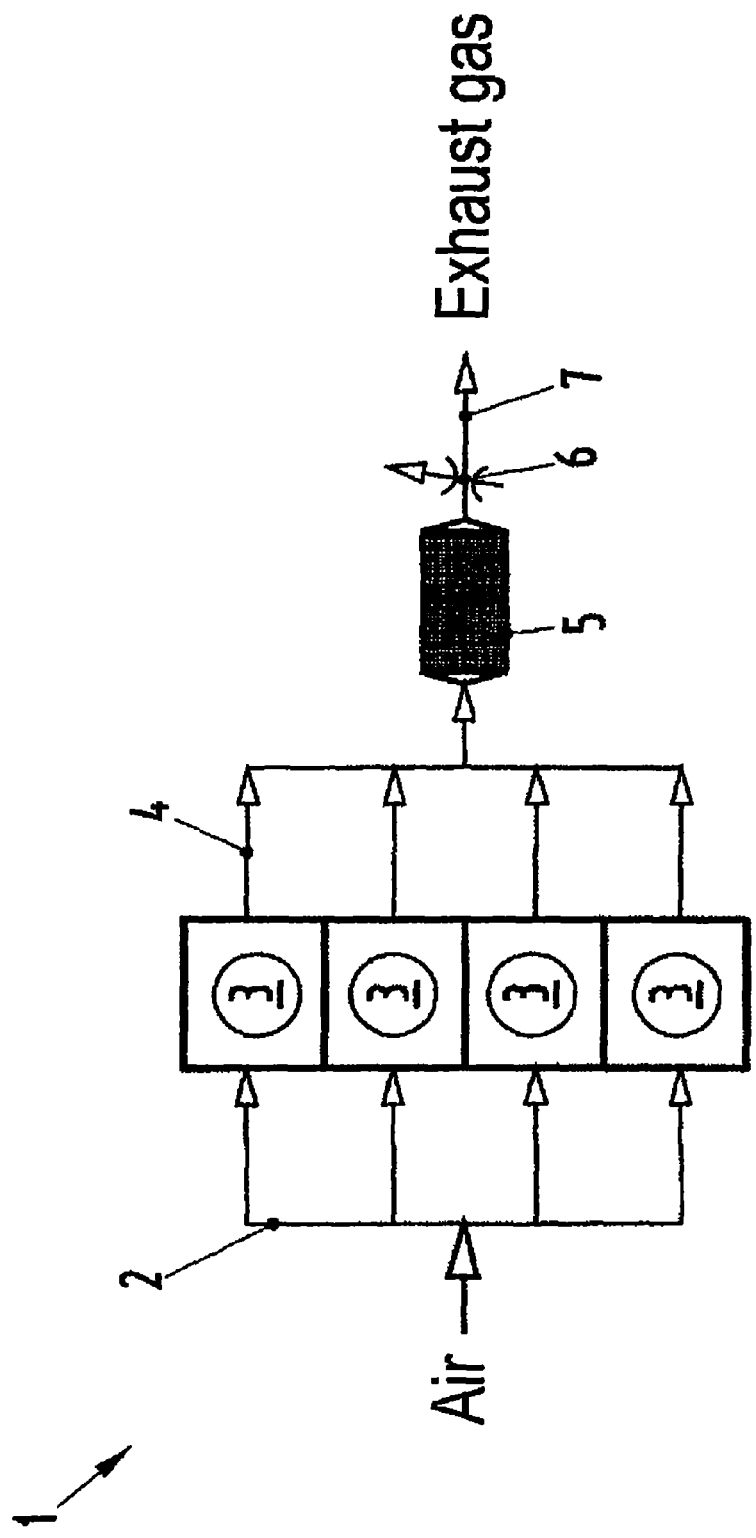
FIG. 1 shows a diagrammatic image of an internal combustion engine according to a first exemplary embodiment.

FIG. 1 illustrates diagrammatically an internal combustion engine 1 which comprises a suction system 2, a plurality of cylinders 3, an exhaust manifold 4, an exhaust-gas catalytic converter 5, an exhaust-gas back-pressure adjustment device designed as an exhaust-gas flap 6 and an exhaust line 7. In each cylinder 3 of the internal combustion engine 1, a piston, not illustrated, is guided, which is held longitudinally and displaceably and between which and a cylinder head, not illustrated, a combustion space is formed. The combustion space of the internal combustion engine 1 is closed off upwards by the cylinder head, the piston delimiting the combustion space downwards. The internal combustion engine 1 comprises per combustion space at least one inlet valve, at least one outlet valve, a fuel injector and an ignition source which is preferably configured as a spark plug.

Figure 2:
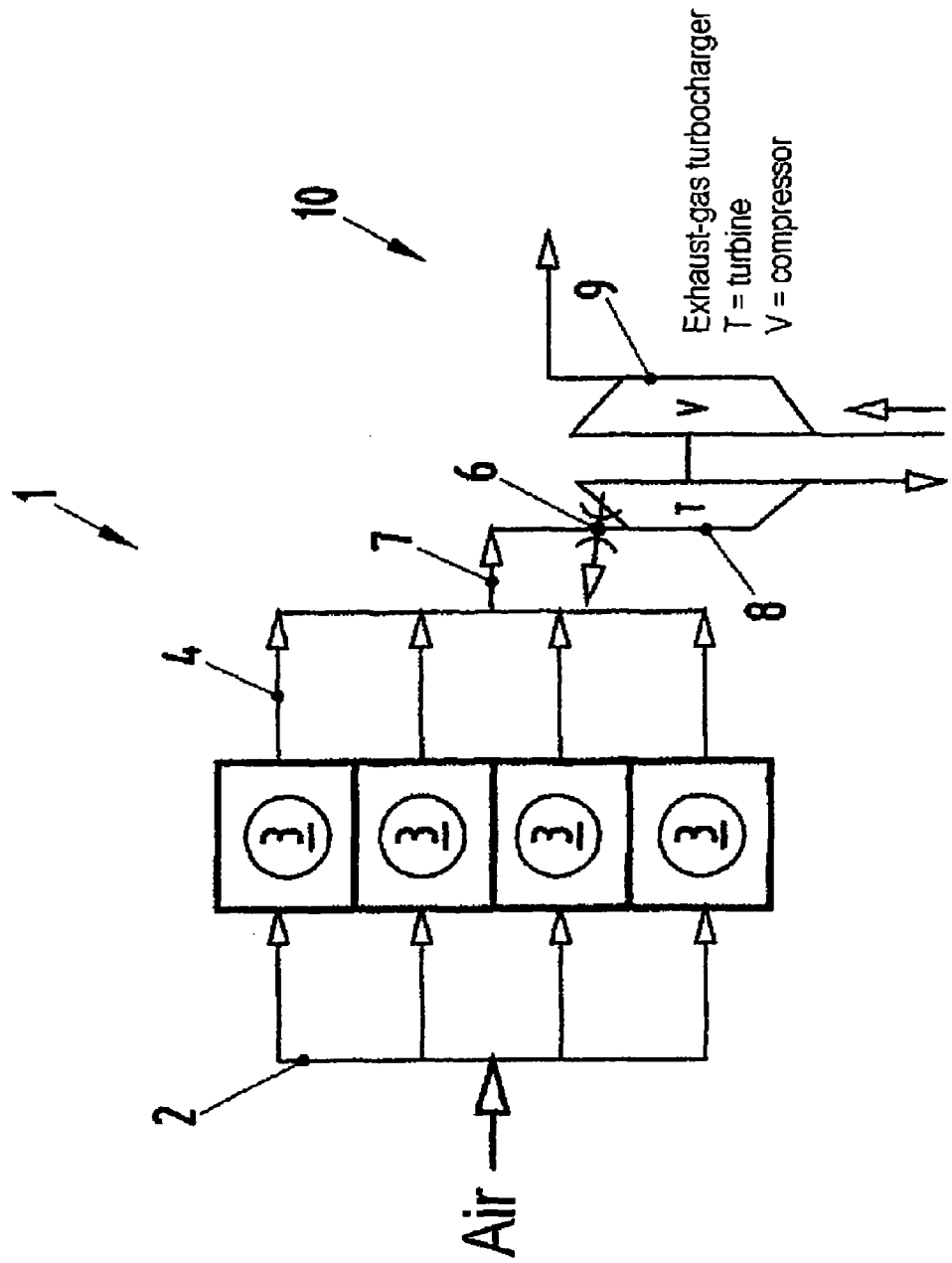
FIG. 2 shows a diagrammatic image of an internal combustion engine according to a second exemplary embodiment.

According to a first embodiment of the invention, an exhaust-gas flap 6 is positioned, downstream of a catalytic converter 5, in the exhaust line 7 of the internal combustion engine 1. According to a second exemplary embodiment of the invention, the internal combustion engine 1 comprises an exhaust-gas turbocharger 10 which has a turbine 8 and a compressor 9. According to the second exemplary embodiment, the exhaust-gas flap 6 is positioned upstream of the inlet into the turbine 8. The internal combustion engine 1 according to aspects of the invention is operated with compression ignition or with spark ignition, depending on the load point. Particularly when the exhaust-gas turbocharger 10 is used, the positioning of the exhaust-gas flap 6 takes place upstream of the exhaust-gas turbine inlet. Consequently, a reliable setting of a uniform exhaust-gas back-pressure in the exhaust manifold of the internal combustion engine is carried out. The operation according to aspects of the invention of the internal combustion engine relates both to the first embodiment and to the second embodiment of the internal combustion engine 1 according to FIGS. 1 and 2.

Figure 3:
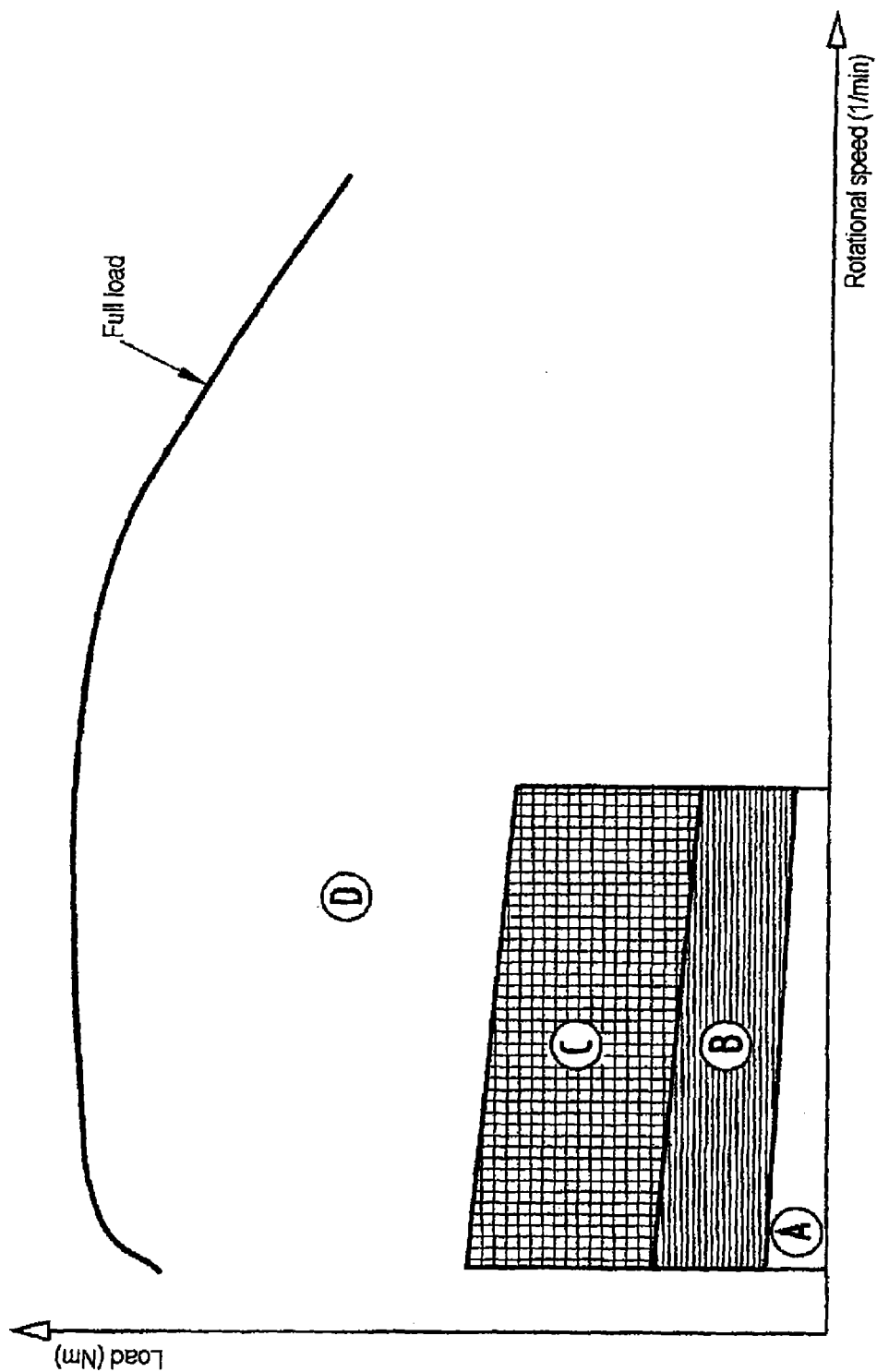
FIG. 3 shows a diagrammatic illustration of an engine characteristic map for an internal combustion engine according to FIG. 1 or FIG. 2.

FIG. 3 depicts different operating point ranges of the internal combustion engine 1. In a low-load range according to characteristic map region A, the internal combustion engine 1 is operated with spark ignition. In a lower load range according to a characteristic map region B and in a lower middle load range according to a characteristic map region C, the internal combustion engine 1 is operated in a compression-ignition mode. By contrast, in an upper load range according to a characteristic map region D, the internal combustion engine 1 is operated with spark ignition.

Fresh air is sucked in by the air suction system 2 of the internal combustion engine 1 and is supplied to the respective combustion space. The exhaust gases formed after each combustion pass into the exhaust manifold 4 and thereafter arrive at the exhaust-gas catalytic converter 5, an exhaust-gas back-pressure within the exhaust manifold 4 being set by means of the exhaust-gas flap 6. The internal combustion engine 1 operates on the four-stroke principle, and, as a function of the load point, it can be operated as a petrol engine, that is to say with spark ignition, or in a compression-ignition mode. In the compression-ignition mode, combustion is initiated by auto-ignition. In a four-stroke method, one stroke corresponds to one complete piston stroke. The operating cycle, consisting of four strokes, of the internal combustion engine 1 corresponds to one combustion cycle, a combustion cycle commencing with an intake phase at a charge exchange top dead centre. During the intake phase, fresh air is supplied to the combustion space, an intake phase extending as far as a bottom dead centre. During the intake phase, fuel is injected into the combustion space by means of the fuel injector positioned in the combustion space. The fuel is mixed with the sucked-in fresh air during the intake phase, so that a fuel/air mixture is formed. Subsequently, during a compression phase, the mixture formed is compressed, the compression phase extending as far as an ignition top dead centre ITDC. Depending on the operating point of the internal combustion engine, the mixture is ignited by auto-ignition or by an ignition spark and is burnt.

Figure 4:
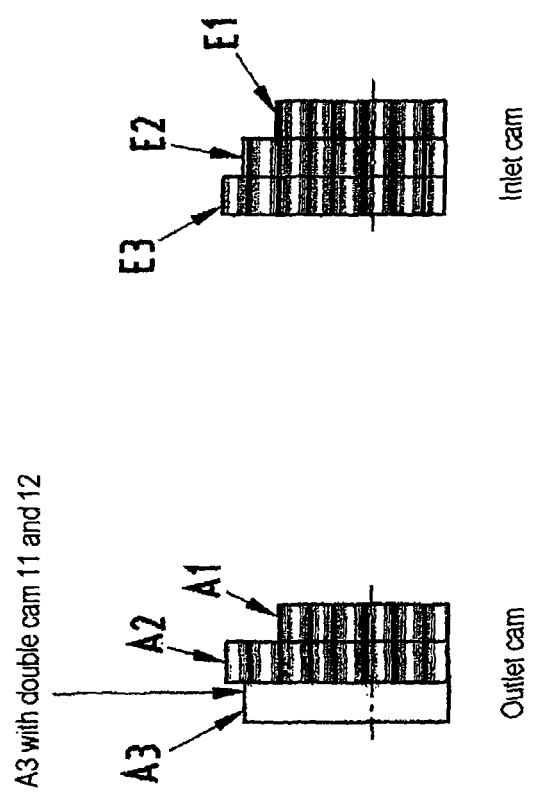
FIG. 4 shows a diagrammatic illustration of inlet cams and outlet cams of a sliding-cam device for an internal combustion engine according to FIG. 1 or FIG. 2.

For actuating the inlet valves, not illustrated, the internal combustion engine 1 has a sliding-cam device, not illustrated, by means of which the actuation of the respective inlet valve takes place, depending on the operating point, by means of a different inlet cam. For this purpose, according to FIG. 4, three inlet cams E1, E2 and E3 are provided, by means of which different valve lifts of the inlet valve can be set. Furthermore, for actuating the outlet valves, the internal combustion engine 1 likewise has a sliding-cam device, not illustrated, which has three different outlet cams A1, A2 and A3, the outlet valve being actuated by an outlet cam, depending on the load point. Different outlet-valve lifts can thereby be set. The actuation of the outlet-side and inlet-side sliding-cam devices may be carried out, for example, according to the publication EP 0 798 451 B1.

Figure 6:
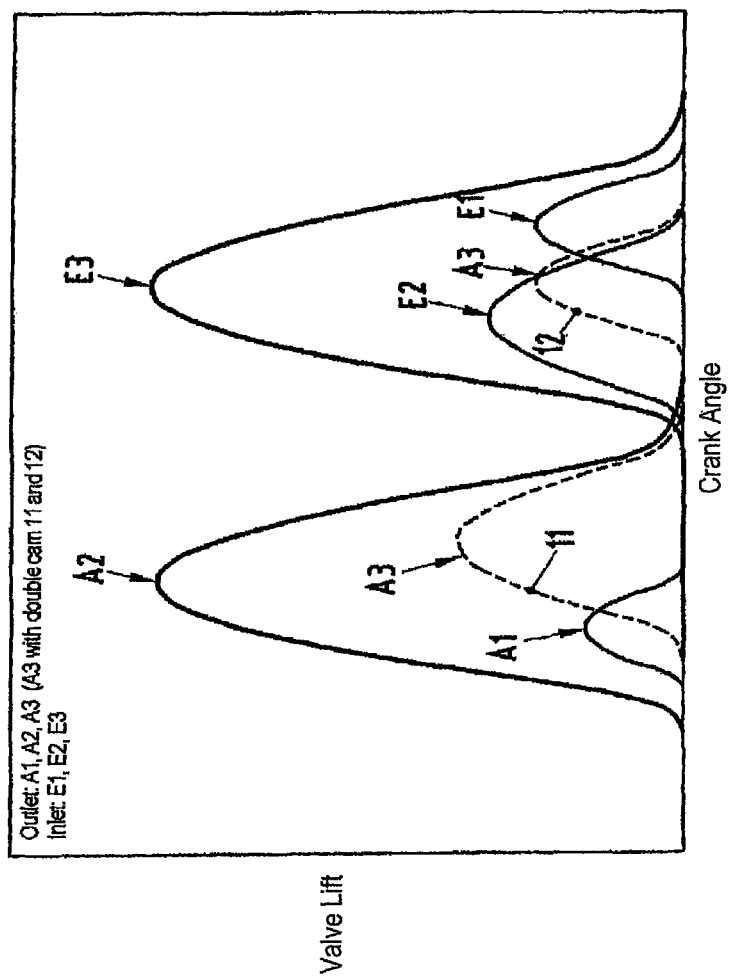
FIG. 6 shows a diagrammatic illustration of lift profiles of the inlet and outlet valves which are actuated by the inlet and outlet cams from FIG. 4.
Figure 7:
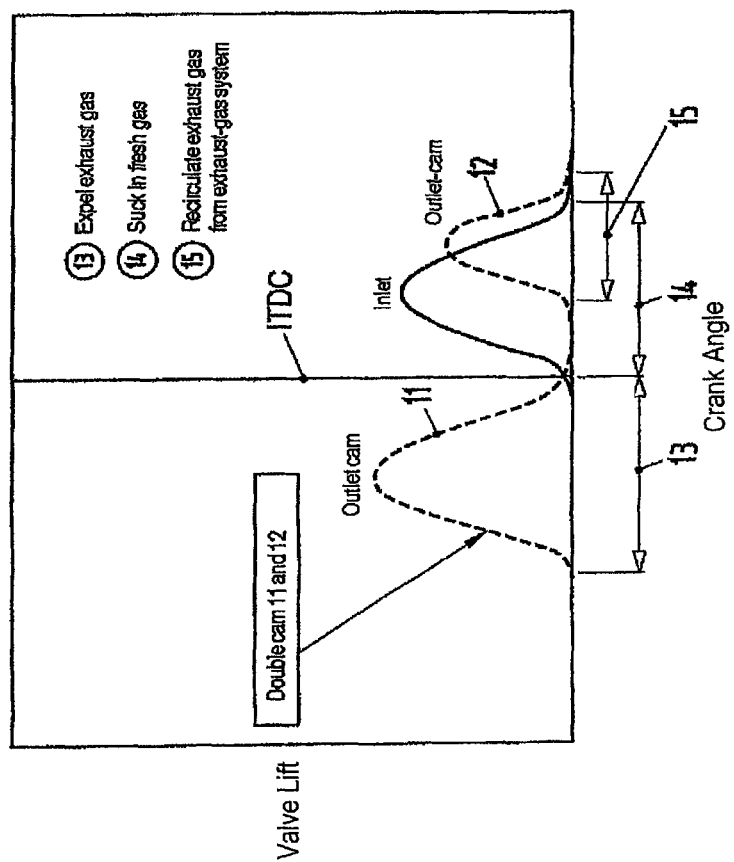
FIG. 7 shows a diagrammatic illustration of lift profiles of the inlet and outlet valves during exhaust-gas recirculation.
Figure 8:
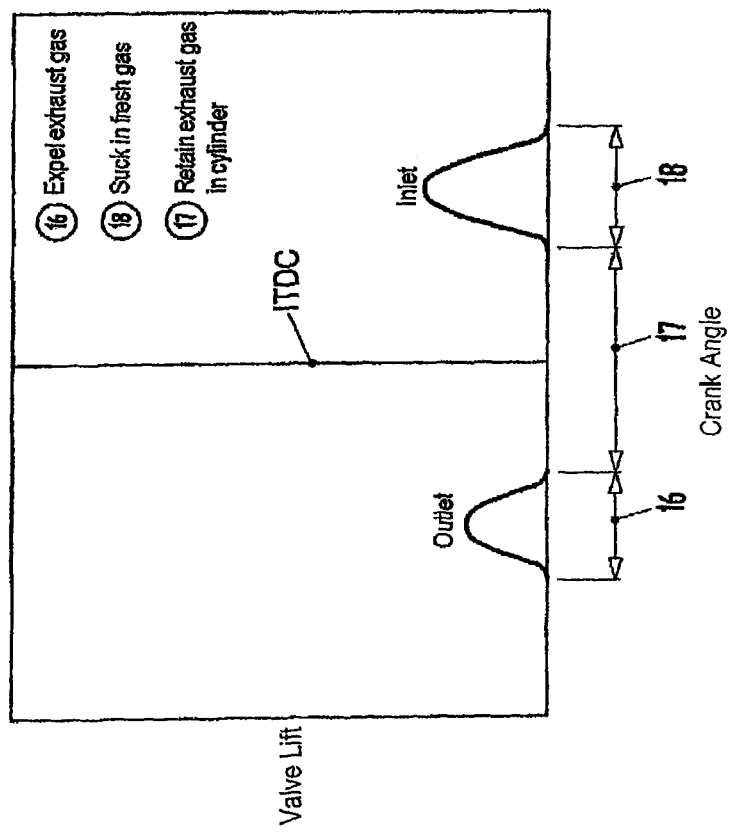
FIG. 8 shows a diagrammatic illustration of lift profiles of inlet and outlet valves during exhaust-gas retention.

According to FIG. 5, the outlet cam A3 has a first cam 11 and a second cam 12, by means of which, when the outlet valve is actuated by the outlet cam A3, two outlet opening phases according to FIGS. 6 and 7 come into effect. When the outlet valve is actuated by the outlet cam A3, during the expulsion stroke the actuation of the outlet valve takes place by means of the cam 11 and causes a first outlet opening phase 13, this being followed by a second outlet opening phase 15 by means of the cam 12, the second outlet opening phase 15 taking place or commencing during an inlet opening phase 14. By virtue of the configuration of the double cam of the outlet cam A3, a specific operating point of the internal combustion engine exhaust gas can be sucked out of the exhaust-manifold region back into the combustion space, since, during the outlet opening phase 15, a vacuum prevails in the combustion space, as compared with the exhaust-gas pressure prevailing in the exhaust manifold 4.

Figure 9:
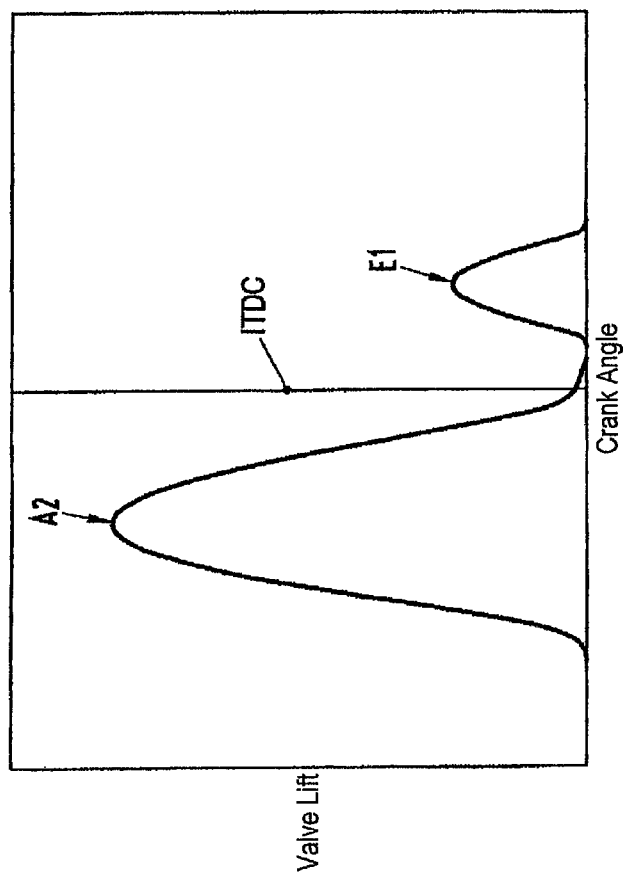
FIG. 9 shows an illustration of valve lift profiles of inlet and outlet valves for an operating point in a low-load range.

FIG. 6 illustrates the valve-lift profiles which occur as a result of operation with respective inlet cams or outlet cams. In a first characteristic map region A, the internal combustion engine 1 is operated with spark ignition, the sliding-cam device being set on the inlet side in such a way that the inlet valves are actuated by the cam E1. In this characteristic map region A, the outlet valves are actuated by the outlet cam A2. This gives rise on the outlet side and on the inlet side to the valve-lift profile illustrated in FIG. 9. Preferably, the internal combustion engine 1 is operated with the characteristic map region A in the case of low loads, for example during the idling of the internal combustion engine 1.

Figure 10:
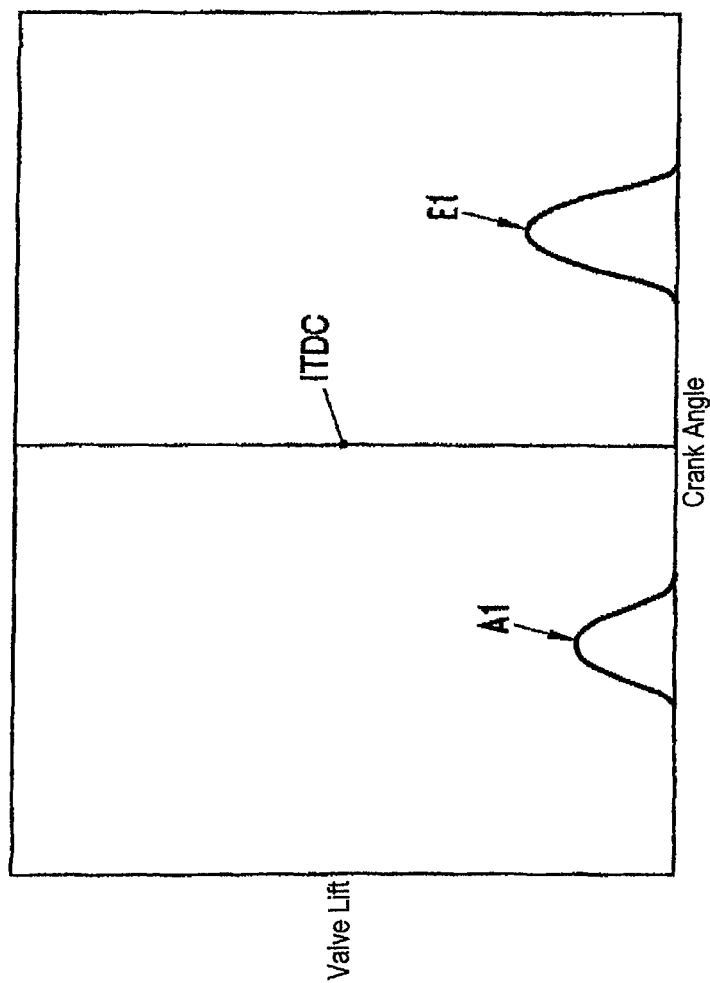
FIG. 10 shows an illustration of valve lift profiles of inlet and outlet valves for an operating point in a lower load range.

Furthermore, according to FIG. 10, the internal combustion engine is operated in a compression-ignition mode in the characteristic map region B, the sliding-cam device here being actuated on the inlet side in such a way that the inlet valve is actuated by the inlet cam E1. The outlet valve is actuated by the outlet cam A1. Furthermore, the internal combustion engine according to the invention has in each case a camshaft adjuster both on the inlet side and on the outlet side, so that the control times of the inlet valves and of the outlet valves can be varied. In the characteristic map region B, for example, the control times 16 and 18 of the outlet valves and of the inlet valves are set in such a way that the closing time points of the outlet valves are early so that a specific exhaust-gas quantity is retained in the combustion space. The opening time point of the inlet valve E1 is correspondingly later, so that the necessary exhaust-gas quantity is retained in the combustion space. A valve interference 17 between the outlet valve and the inlet valve is set here.

FIG. 11 illustrates the operation of the internal combustion engine in the characteristic map region C where the inlet cam E2 is set on the inlet side for actuating the inlet valves. To actuate the outlet valve, the outlet cam A3 is provided, which has the first cam 11 and the second cam 12. When corresponding control times are set by the camshaft adjusters on the inlet side and on the outlet side, no exhaust-gas retention occurs in this characteristic map region C. In order to set sufficient exhaust gas in the combustion space for compression ignition, a recirculation of exhaust gas from the exhaust manifold 4 takes place in the characteristic map region C and come into effect as a result of the second outlet opening phase 15. In the upper load range, the internal combustion engine 1 is operated according to a characteristic map region D with spark ignition, according to FIG. 12 the cam E3 being provided on the inlet side and the cam A2 on the outlet side for operation in the characteristic map region D.

According to aspects of the present invention, the internal combustion engine 1 is preferably operated with petrol, and in this case the internal combustion engine 1 can be operated as a supercharged petrol engine. The configuration of the sliding-cam devices on the inlet side and outlet side permits the method according to aspects of the invention or the operation of the internal combustion engine 1 in the characteristic map regions B and C with auto-ignition by exhaust-gas retention and exhaust-gas recirculation, the internal combustion engine 1 temporarily being operated with spark ignition during a characteristic map changeover from the characteristic map region B to C, and vice versa. Here, the internal combustion engine 1 is operated on the inlet side by the inlet cam E2 and on the outlet side by the outlet cam A2. By virtue of the method according to aspects of the invention, the fuel consumption of the internal combustion engine 1 is optimized and exhaust-gas emissions are minimized. The method according to aspects of the invention makes it possible to extend petrol auto-ignition to a broad characteristic map range which has not been possible hitherto. By the internal combustion engine 1 being operated according to aspects of the invention, a reduction in the fuel consumption and in the exhaust-gas emissions is achieved, while, in particular, the nitrogen oxide emissions during efficiency-optimized operation of the internal combustion engine are minimized.

The invention relates to a method for operating the internal combustion engine 1 with a plurality of cylinders 3, which are each assigned an inlet valve, an outlet valve and a combustion space, with an inlet camshaft connected to a camshaft adjuster, with an outlet camshaft connected to a camshaft adjuster, with a switchable inlet-valve drive which has a plurality of inlet cams for actuating the respective inlet valve, with a switchable outlet-valve drive which has a plurality of outlet cams for actuating the respective outlet valve, and with an exhaust-gas system, the internal combustion engine being operated with compression ignition or with spark ignition as a function of the operating point, and a specific residual exhaust-gas quantity in the combustion space being set for compression ignition. Furthermore, the internal combustion engine is operated as a function of the operating point by means of an outlet cam, by means of which a first outlet opening phase and a second outlet opening phase take place, the second outlet opening phase commencing during an inlet opening phase. At a first operating point in a compression-ignition mode, the residual exhaust-gas quantity in the combustion space is dimensioned as a function of a valve interference set between the inlet and the outlet valve during a charge exchange, at a second operating point in the compression-ignition mode the residual exhaust-gas quantity in the combustion space being dimensioned as a function of a duration of the second outlet opening phase.

The invention claimed is:

1. A method for operating an internal combustion engine with a plurality of cylinders, which are each assigned an inlet valve, an outlet valve and a combustion space, with an inlet camshaft connected to a camshaft adjuster, with an outlet camshaft connected to a camshaft adjuster, with a switchable inlet-valve drive which has a plurality of inlet cams for actuating a respective inlet valve, with a switchable outlet-valve drive which has a plurality of outlet cams for actuating a respective outlet valve, and with an exhaust-gas system, the method comprising:

operating the internal combustion engine with compression ignition or with spark ignition as a function of an operating point, setting a specific residual exhaust-gas quantity in the combustion space for compression ignition, operating the internal combustion engine as a function of the operating point by an outlet cam, by which a first outlet opening phase and a second outlet opening phase take place, the second outlet opening phase commencing during an inlet opening phase, setting the residual exhaust-gas quantity in the combustion space at a first operating point in a compression-ignition mode as a function of a valve interference set between the inlet valve and the outlet valve during a charge exchange, setting the residual exhaust-gas quantity in the combustion space at a second operating point in the compression-ignition mode as a function of a duration of the second outlet opening phase, and wherein the internal combustion engine is operated with spark ignition during a changeover from the first operating point to the second operating point, and vice versa.

2. The method according to claim 1, wherein the inlet valves and the outlet valves are controlled, at the second operating point of the compression-ignition mode, in such a way that a specific exhaust-gas quantity is sucked out of the exhaust-gas system back into the combustion space.

3. The method according to claim 1, wherein the outlet-valve drive and the inlet-valve drive are configured in such a way that, as a function of the operating point, in each case different valve lifts and/or different control times are set on an outlet side and on an inlet side.

4. The method according to claim 1 wherein the exhaust-gas system is provided with an exhaust-gas back-pressure adjustment device, by which the exhaust-gas back-pressure in an exhaust manifold of the exhaust-gas system is varied as a function of the operating point.

5. The method according to claim 4, wherein the residual exhaust-gas quantity in the combustion space is set as a function of a position of the exhaust-gas back-pressure adjustment device.

6. An internal combustion engine, comprising:
a plurality of cylinders, which are each assigned an inlet valve, an outlet valve and a combustion space, with an inlet camshaft connected to a camshaft adjuster, with an outlet camshaft connected to a camshaft adjuster, with a switchable inlet-valve drive which has a plurality of inlet cams for actuating a respective inlet valve, with a switchable outlet-valve drive which has a plurality of outlet cams for actuating a respective outlet valve, with an exhaust-gas system, and with an exhaust-gas back-pressure adjustment device, by which the exhaust-gas back-pressure in an exhaust manifold of the exhaust-gas system is varied as a function of an operating point, wherein the exhaust-gas back-pressure adjustment device is designed as an exhaust-gas flap, and a controller configured to perform the following steps:

operating the internal combustion engine with compression ignition or with spark ignition as a function of the operating point, setting a specific residual exhaust-gas quantity in the combustion space for compression ignition, operating the internal combustion engine as a function of the operating point by an outlet cam, by which a first outlet opening phase and a second outlet opening phase take place, the second outlet opening phase commencing during an inlet opening phase, setting the residual exhaust-gas quantity in the combustion space at a first operating point in a compression-ignition mode as a function of a valve interference set between the inlet valve and the outlet valve during a charge exchange, and, setting the residual exhaust-gas quantity in the combustion space at a second operating point in the compression-ignition mode as a function of a duration of the second outlet opening phase.

7. The internal combustion engine of claim 6, wherein the exhaust-gas back-pressure adjustment device is positioned upstream of an inlet into an exhaust-gas turbine in the exhaust-gas system.

8. The internal combustion engine according to claim 6, further comprising a sliding-cam device having a plurality of cams is provided in the outlet-valve drive, at least one outlet cam being configured as a double cam for setting two outlet opening phases, the inlet-valve drive having a sliding-cam device with a plurality of cams.

9. An internal combustion engine, comprising:

a plurality of cylinders, which are each assigned an inlet valve, an outlet valve and a combustion space, with an inlet camshaft connected to a camshaft adjuster, with an outlet camshaft connected to a camshaft adjuster, with a switchable inlet-valve drive which has a plurality of inlet cams for actuating a respective inlet valve, with a switchable outlet-valve drive which has a plurality of outlet cams for actuating a respective outlet valve, with an exhaust-gas system, and with an exhaust-gas back-pressure adjustment device, by which the exhaust-gas back-pressure in an exhaust manifold of the exhaust-gas system is varied as a function of an operating point, wherein the exhaust-gas back-pressure adjustment device is positioned downstream of an exhaust-gas catalytic converter in the exhaust-gas system, and a controller configured to perform the following steps:

operating the internal combustion engine with compression ignition or with spark ignition as a function of the operating point, setting a specific residual exhaust-gas quantity in the combustion space for compression ignition, operating the internal combustion engine as a function of the operating point by an outlet cam, by which a first outlet opening phase and a second outlet opening phase take place, the second outlet opening phase commencing during an inlet opening phase, setting the residual exhaust-gas quantity in the combustion space at a first operating point in a compression-ignition mode as a function of a valve interference set between the inlet valve and the outlet valve during a charge exchange, and, setting the residual exhaust-gas quantity in the combustion space at a second operating point in the compression-ignition mode as a function of a duration of the second outlet opening phase.

* * * * *